(12) United States Patent
Srivastava

(10) Patent No.: US 12,210,620 B2
(45) Date of Patent: Jan. 28, 2025

(54) APPARATUS AND METHOD TO DETECT POWER SUPPLY SECURITY ATTACK AND RISK MITIGATION

(71) Applicant: Intel Corporation, Santa Clara, CA (US)

(72) Inventor: Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 782 days.

(21) Appl. No.: 17/203,553

(22) Filed: Mar. 16, 2021

(65) Prior Publication Data

US 2022/0300608 A1    Sep. 22, 2022

(51) Int. Cl.
*G06F 21/55*     (2013.01)
*G06N 3/04*      (2023.01)
*G06N 3/088*     (2023.01)

(52) U.S. Cl.
CPC ............. *G06F 21/554* (2013.01); *G06N 3/04* (2013.01); *G06N 3/088* (2013.01); *G06F 2221/034* (2013.01)

(58) Field of Classification Search
CPC ............. G06F 21/554; G06F 2221/034; G06F 21/755; G06N 3/04; G06N 3/088; G06N 20/00
See application file for complete search history.

(56) References Cited

U.S. PATENT DOCUMENTS 5,625,751 A * 4/1997 Brandwajn ............... H02J 3/24
                                              706/907
8,745,724 B2 * 6/2014 Kothari .................. H03K 3/037
                                              726/16

(Continued)

FOREIGN PATENT DOCUMENTS

WO    WO-2019202494 A1 *  10/2019

OTHER PUBLICATIONS

Ye et al.; "On-Chip Droop-Induced Circuit Delay Prediction Based on Support-Vector Machines", 2016, IEEE Transactions on Computer-Aided Design of Integrated Circuits and Systems, vol. 35, No. 4, pp. 665-678. (Year: 2016).*

(Continued)

*Primary Examiner* — Matthew Smithers
(74) *Attorney, Agent, or Firm* — Schwabe, Williamson & Wyatt, P.C.

(57) ABSTRACT

Hardware based unsupervised based machine-learning (ML) approach to identify a security threat to the processor (e.g., caused by probing of a power supply rail). An apparatus is provided which includes an on-die power supply droop detector as a feature extractor. The droop detector detects a droop in the power supply caused by a probe physically coupling to the power supply rail. The droop detector in combination with machine-learning logic detects change in power supply rail impedance profile due to a probe coupled to the power supply rail. A deep-neural network (DNN) is provided for feature classification that classifies a security threat from normal operation and from operations caused by aging of devices in the processor. The DNN is trained in a training phase or production phase of the processor. An aging sensor is used to distinguish classification of aged data vs. normal data and data from security attack.

21 Claims, 9 Drawing Sheets

(56) References Cited

U.S. PATENT DOCUMENTS

| | | | | |
|---|---|---|---|---|
| 9,819,258 | B1* | 11/2017 | Vandam | G01R 31/31816 |
| 10,114,981 | B2* | 10/2018 | Kwasnick | G06F 21/88 |
| 10,171,081 | B1* | 1/2019 | Bose | H03K 17/162 |
| 10,261,561 | B2* | 4/2019 | Chuang | G06F 1/26 |
| 10,437,311 | B2* | 10/2019 | Chuang | G06F 1/324 |
| 11,210,444 | B1* | 12/2021 | Chang | G06F 30/3312 |
| 11,913,986 | B2* | 2/2024 | He | H02M 7/537 |
| 2015/0094975 | A1* | 4/2015 | Zaro | G01R 19/2513 702/66 |
| 2015/0378412 | A1* | 12/2015 | Suryanarayanan | G06F 9/3836 713/340 |
| 2018/0067541 | A1* | 3/2018 | Chuang | G06F 1/305 |
| 2018/0189522 | A1* | 7/2018 | Kwasnick | G06F 21/10 |
| 2020/0104497 | A1* | 4/2020 | Crouch | G06F 21/76 |
| 2020/0117249 | A1* | 4/2020 | Ferguson | H02J 13/00002 |
| 2020/0176044 | A1* | 6/2020 | Lees | G06F 12/1491 |
| 2020/0249276 | A1* | 8/2020 | Pappu | G01R 31/31835 |
| 2020/0310516 | A1* | 10/2020 | Webel | G06F 1/28 |
| 2021/0089876 | A1* | 3/2021 | Nikonov | H03M 1/66 |
| 2021/0116982 | A1* | 4/2021 | Khanna | G06F 1/3287 |
| 2021/0117249 | A1* | 4/2021 | Doshi | H04L 67/1001 |
| 2021/0190835 | A1* | 6/2021 | Felix | G06F 1/10 |
| 2022/0279220 | A1* | 9/2022 | Khavronin | G06Q 30/0201 |
| 2022/0294217 | A1* | 9/2022 | Spalt | G06Q 10/04 |
| 2022/0360076 | A1* | 11/2022 | Sabin | H02J 3/0012 |
| 2022/0365116 | A1* | 11/2022 | Felix | G06F 1/28 |

OTHER PUBLICATIONS

Zhang et al.; "Blacklist Core: Machine-Learning Based Dynamic Operating-Performance-Point Blacklisting for Mitigating Power-Management Security Attacks", 2018, ACM, pp. 1-6. (Year: 2018).*

Kenarangi, Farid et al., "Exploiting Machine Learning Against On-Chip Power Analysis Attacks: Tradeoffs and Design Considerations", IEEE Transactions on Circuits and Systems—I: Regular Papers, vol. 66, No. 2, Feb. 2019, 13 pgs.

Utyamishev, Dmitry et al., "Real-Time Detection of Power Analysis Attacks by Machine Learning of Power Supply Variations On-Chip", IEEE Transactions on Computer-Aided Design of Integrated Circuits and Systems, vol. 39, No. 1, Jan. 2020, 45 pgs.

* cited by examiner

APPARATUS AND METHOD TO DETECT POWER SUPPLY SECURITY ATTACK AND RISK MITIGATION

BACKGROUND

A hacker can attack a processor or system-on-chip (SoC) by probing a power supply rail for the processor or SoC. For example, a hacker can measure a supply droop profile for the power supply rail and generate a correlation factor to extract a cryptographic key or a processor or SoC security key. Equation 1 expresses voltage on a probe as a function of correlation factor.

$$V(\text{probe}) = V_0 + \Sigma_{n=1}^{M} \alpha i (V_{internal}[n]) \quad (1)$$

where $\alpha i$ is correlation voltage, V(probe) is the voltage on the probe at location of the processor or SoC, $V_0$ is DC voltage, and $V_{internal}$ supply voltage variation in time domain. Hackers keep measuring V(probe) at various chip locations and once the cryptographic key is identified, hackers can get access to secure data in the processor or SoC, and/or take any malicious action.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
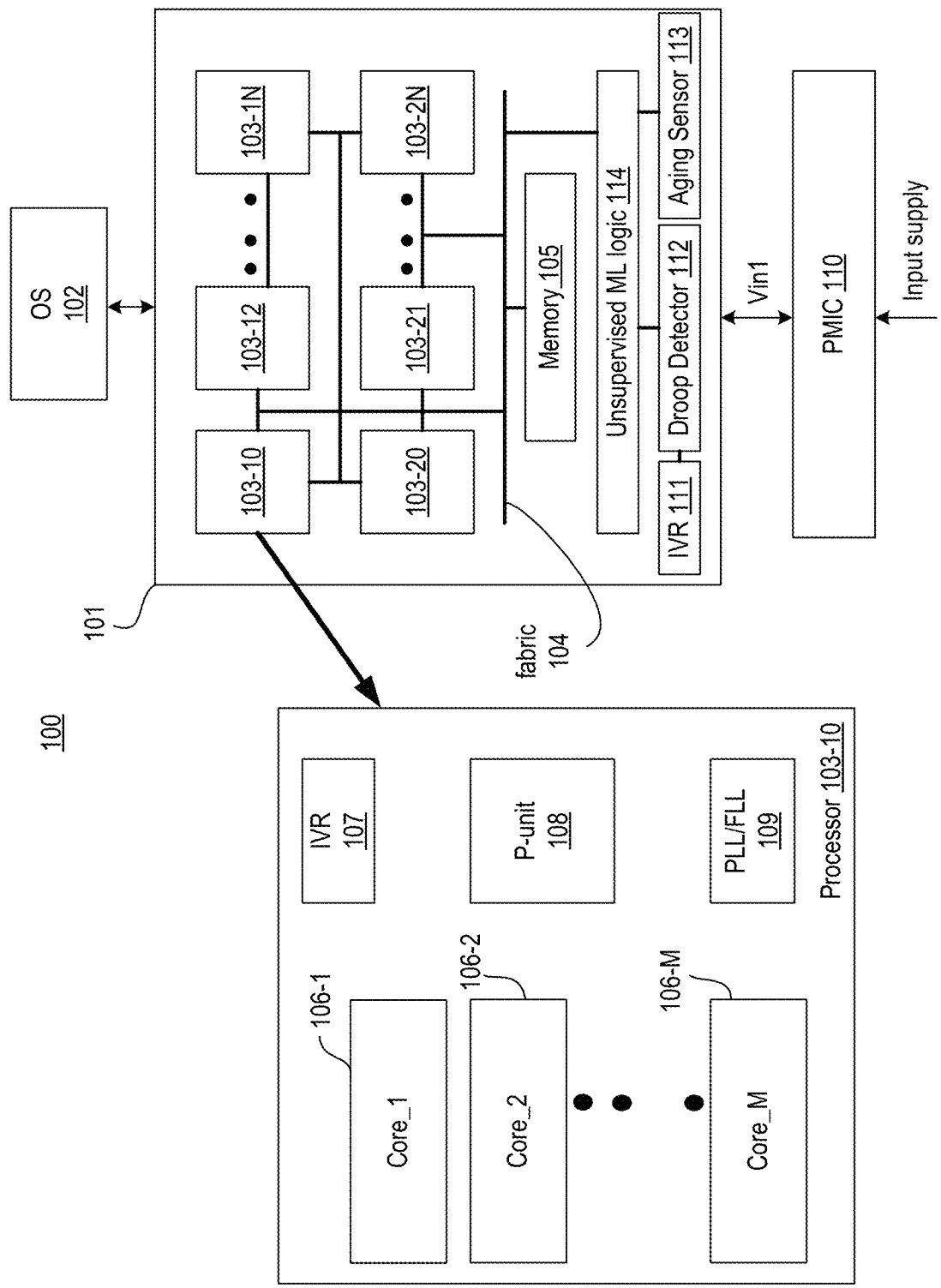
FIG. 1 illustrates a processor with hardware based unsupervised based machine-learning (ML) approach to identify and mitigate a security threat to the processor, in accordance with some embodiments.

During probing of the power supply rail, the probe causes a change in internal power delivery impedance profile near the probing zone area. Some ways to mitigate a malicious attack, in accordance with some embodiments, is to randomize an internal power supply sequence, mask events, use linear regulator or switching regulator internally so that the hacker always sees a constant voltage profile on its probe when probing the power supply rail. Such mitigation techniques weaken the correlation factors, which in turn make it harder to decipher the cryptographic keys or processor security keys. However, weakening the correlation factor may not be enough because some correlation factor may still be enough for hackers to figure out the cryptographic key. For example, weaker correlation factor can be extracted through techniques such as linear regression. Randomizing internal sequence of signals (such as power supply sequencing) may not be random in the purest sense because filter mechanisms can identify a pattern in the randomized internal sequence of signals.

Some embodiments use hardware based unsupervised based machine-learning (ML) approach to identify a security threat to the processor or SoC (e.g., caused by probing of a power supply rail). In some embodiments, an apparatus is provided which includes an on-die power supply droop detector as a feature extractor. For example, the droop detector detects a droop in the power supply caused by a probe physically coupling to the power supply rail. In some embodiments, the droop detector in combination with machine-learning logic detects change in power supply rail impedance profile due to a probe coupled to the power supply rail. In some embodiments, a deep-neural network (DNN) is provided for feature classification that classifies a security threat from normal operation and from operations caused by aging of devices in the processor. The DNN is trained in a training phase or production phase of the processor. In some embodiments, an aging sensor is used to distinguish classification of aged data (data from devices that are aged) vs. normal data and data from security attack. In some embodiments, during the training phase, weights are calculated to correctly identify and classify data indicative of security risk, data of aged devices, and data showing normal use. In some embodiments, the trained weights are stored in memory and used during classification of input data. In some embodiments, based on the classified data, inter-cluster and intra-cluster distance data is calculated. The distance data distinguishes data from aged devices, normal use, and threats. As such, the distance data is used to identify a threat.

In some embodiments, upon identification of the security threat, the processor or SoC is informed of an unauthorized attack so that the processor or SoC can act. Examples of such acts include changing the security key, disconnecting the processor from peripherals, disabling an I/O clock to prevent communication with peripherals, informing software or operating system of possible threat, instructing an operating system to reduce access to certain registers by software or firmware, notifying a server or user of possible attack, shutting down the system (e.g., powering it down), etc.

There are many technical effects of the various embodiments. For example, the unsupervised machine-learning scheme provided robust identification of a security threat during runtime or real-time, and thus enables security attack mitigation. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates a processor with hardware based unsupervised based machine-learning (ML) approach to identify and mitigate a security threat to the processor, in accordance with some embodiments. Processor system 100 comprises processor 101 coupled to operating system (OS) 102. Processor 101 comprises one or more processors 103 (individually labeled as processors 103_10 through 103_1N, and 103_20 through 103_2N, where 'N' is a number), fabric 104 connecting the processor 103, and memory 105. In some embodiments, each processor 103 is a die, dielet, or chiplet. Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor 103 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

In some embodiments, fabric 104 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

In some embodiments, each of the one or more processor 103 may include a number of processor cores. One such example is illustrated with reference to processor 103_10. In this example, processor 103_10 includes a plurality of processor cores 106-1 through 106-M, where M is a number. For the sake of simplicity, a processor core is referred by the general label 106. Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core. Processor 103_10 may include an integrated voltage regulator (IVR) 107, power control unit (p-unit) 108, phase locked loop (PLL) and/or frequency locked loop (FLL) 109. The various blocks of processor 103_10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, p-unit 108 is coupled to OS 102 via an interface. Here the term "interface" generally refers to software and/or hardware used to communicate with an interconnect. An interface may include logic and I/O driver/receiver to send and receive data over the interconnect or one or more wires.

In some embodiments, each processor 103 is coupled to a power supply via voltage regulator. The voltage regulator may be internal to processor system 101 (e.g., on the package of processor system 101) or external to processor system 101. In some embodiments, each processor 103 includes IVR 107 that receives a primary regulated voltage from the voltage regulator of processor system 101 and generates an operating voltage for the agents of processor 103. The agents of processor 103 are the various components of processor 103 including cores 106, IVR 107, p-unit 108, and PLL/FLL 109.

Accordingly, an implementation of IVR 107 may allow for fine-grained control of voltage and thus power and performance of each individual core 106. As such, each core 106 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 106 may include an IVR to manage power supply to that core where that IVR receives input power supply from the regulated output of IVR 107 or voltage regulator of processor system 101. During power management, a given power domain of one IVR may be powered down or off when the processor core 106 is placed into a certain low power state, while another power domain of another IVR remains active, or fully powered. As such, an IVR may control a certain domain of a logic or processor core 106. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to as an Autonomous Perimeter (AP). A domain can be an entire system-on-chip (SoC) or part of the SoC, and is governed by a p-unit.

In some embodiments, each processor 103 includes its own p-unit 108. P-unit 108 controls the power and/or performance of processor 103. P-unit 108 may control power and/or performance (e.g., IPC, frequency) of each individual core 106. In various embodiments, p-unit 108 of each processor 103 is coupled via fabric 104. As such, the p-units 108 of each processor 103 communicate with another and OS 102 to determine the optimal power state of processor system 101 by controlling power states of individual cores 106 under their domain.

P-unit 108 may include circuitry including hardware, software and/or firmware to perform power management operations with regard to processor 103. In some embodiments, p-unit 108 provides control information to voltage regulator of processor system 101 via an interface to cause the voltage regulator to generate the appropriate regulated voltage. In some embodiments, p-unit 108 provides control information to IVRs of cores 106 via another interface to control the operating voltage generated (or to cause a corresponding IVR to be disabled in a low power mode). In some embodiments, p-unit 108 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 108 is implemented as a microcontroller. The microcontroller can be an embedded microcontroller which is a dedicated controller or as a general-purpose controller. In some embodiments, p-unit 108 is implemented as a control logic configured to execute its own dedicated power management code, here referred to as pCode. In some embodiments, power management operations to be performed by p-unit 108 may be implemented externally to a processor 103, such as by way of a separate power management integrated circuit (PMIC) or other component external to processor system 101. In yet other embodiments, power management operations to be performed by p-unit 108 may be implemented within BIOS or other system software. In some embodiments, p-unit 108 of a processor 103 may assume a role of a supervisor or supervisee.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit In various embodiments, p-unit 108 executes a firmware (referred to as pCode) that communicates with OS 102. In various embodiments, each processor 103 includes a PLL or FLL 109 that generates clock from p-unit 108 and input clock (or reference clock) for each core 106. Cores 106 may include or be associated with independent clock generation circuitry such as one or more PLLs to control operating frequency of each core 106 independently.

Some embodiments use hardware based unsupervised machine-learning (ML) approach to identify a security threat to processor system 101 (e.g., caused by probing of a power supply rail). A power management integrated circuit (PMIC) 110 may receive an input power supply and generate another power supply Vin1 which is provided to processor system 101. Vin1 power supply is then used by one or more integrated voltage regulators (IVR) 111 to generate power supply for various components of processor system 100. For example, IVR 111 generates an output power supply which is provided as input power supply to cores 106 and memory 105. In some embodiments, an apparatus to detect and mitigate a security attack comprises droop detector 112, aging sensor 113, and unsupervised ML logic 114.

In some embodiments, droop detector 112 is used as a feature extractor to determine any droop on the power supply output by IVR 111. For example, droop detector 112 detects a droop in the power supply output by IVR 111 caused by a probe physically coupling to the Vin1 power supply rail. In some embodiments, droop detector 112 in combination with machine-learning logic 114 detects change in power supply rail impedance profile due to a probe coupled to the Vin1 power supply rail. The same mechanism of detecting a security threat is also applicable when a probe is placed on the power supply output of IVR 111.

In some embodiments, unsupervised ML logic includes deep-neural network (DNN) for feature classification. DNN classifies a security threat (caused by a probe for example) from normal operation and from operations caused by aging of devices in the processor. The DNN is trained in a training phase or production phase of processor system 101. In some embodiments, aging sensor 113 is used to distinguish classification of aged data (data from devices that are aged) vs. normal data and data from security attack. In some embodiments, during the training phase, weights are calculated to correctly identify and classify data indicative of security risk, data of aged devices, and data showing normal use. In some embodiments, the trained weights are stored in memory (e.g., memory 105 or a dedicated read-only memory (ROM)) and used during classification of input data. In some embodiments, based on the classified data, inter-cluster and intra-cluster distance data is calculated. The distance data distinguishes data from aged devices, normal use, and threats. As such, the distance data is used to identify a threat.

In some embodiments, upon identification of the security threat, processor system 101 or SoC is informed of an unauthorized attack so that processor system 101 can act. Examples of such acts include changing the security key, disconnecting processor system 101 from peripherals, disabling an I/O clock to prevent communication with peripherals, informing software or operating system 102 of possible threat, instructing operating system 102 to reduce access to certain registers by software or firmware, notifying a server or user of possible attack, shutting down processor system 101 (e.g., powering it down), etc.

Figure 2:
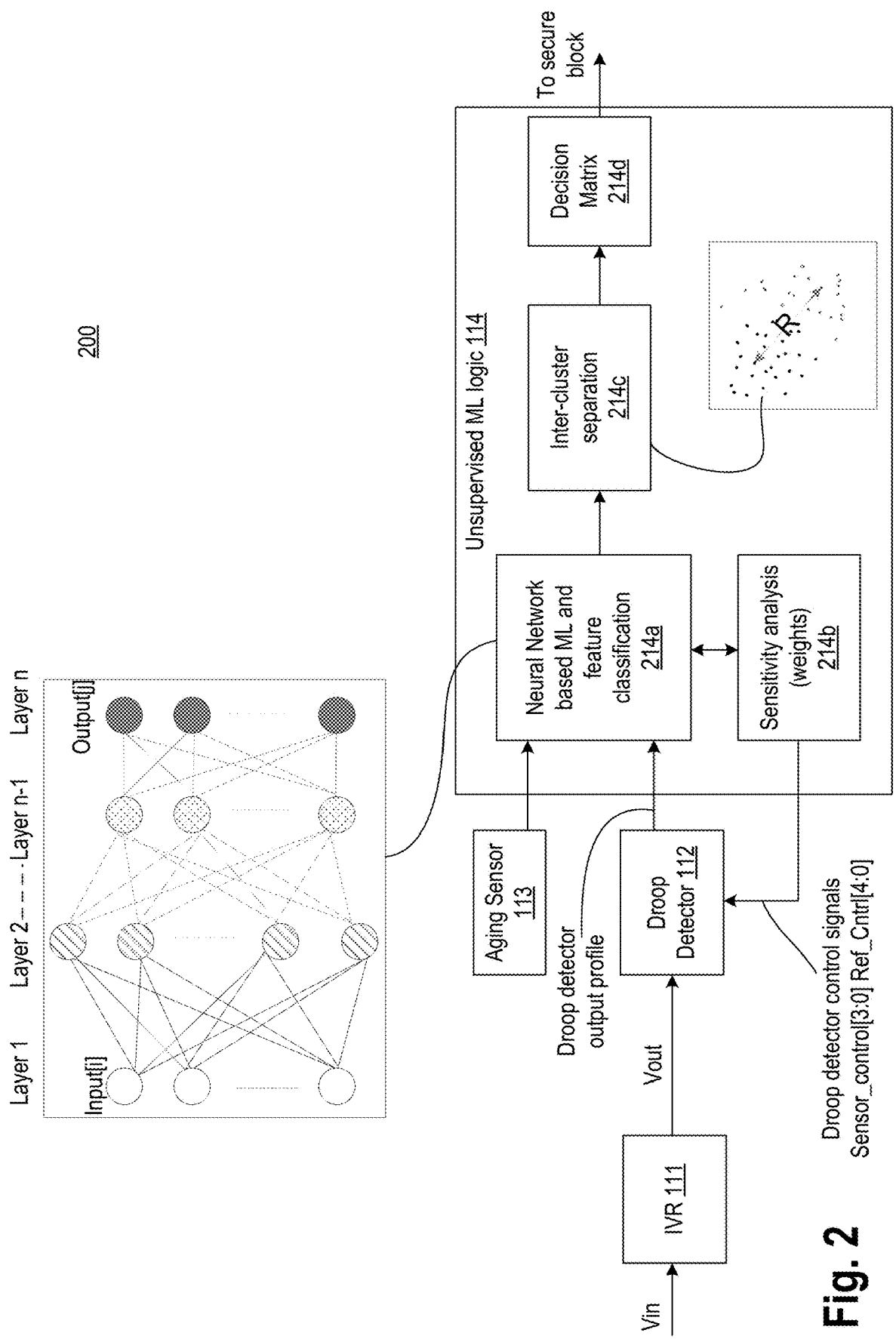
FIG. 2 illustrates a high-level architecture of an apparatus to identify a security threat to the processor, in accordance with some embodiments.

FIG. 2 illustrates a high-level architecture of apparatus 200 to identify a security threat to the processor, in accordance with some embodiments. Apparatus 200 comprises IVR 111, droop detector 112, aging sensor 113, and unsupervised ML logic 114. In some embodiments, unsupervised ML logic 114 comprises DNN based ML feature classification logic 214a, apparatus for sensitivity analysis 214b, apparatus for inter-cluster separation 214c, and decision matrix logic 214d. In some embodiments, the various components of unsupervised ML logic 114 can be combined in a single logic. While the embodiments are described with reference to DNN, other deep learning architectures may be used. For example, deep belief networks, recurrent neural networks and convolutional neural networks may be used instead of DNN or in addition to DNN. Here, the term "deep" in deep learning refers to the use of multiple layers in the network as indicated by layers 1 through layer n for the network of DNN 214a.

In some embodiments, during training phase, weights are determined to classify the output profile of droop detector into classes of security threat, normal behavior, and behavior caused by aging of devise in droop detector 112 and/or other devices coupled to the power supply rail Vout. In some embodiments, training phase occurs in production (e.g., after or during sort and test of processor system 101). In the training phase, sensitivity analysis is performed by logic 214b where weights are determined for properly classifying the output profile of droop detector 112. In some embodiments, the output droop profile is sampled in different time windows. For example, in eight different time windows, the output profile of droop detector 112 is sampled. Table 1 illustrates one such example of sampling the output profile of droop detector 112 in eight different time windows.

TABLE 1

| Sampled output (droop voltage) Trained pattern | | | | | | | |
|---|---|---|---|---|---|---|---|
| window | | | | | | | |
| output | 0.05 | 0.05 | 0.1 | 0.15 | 0.15 | 0.1 | 0.05 | 0.05 |
| | 0.01 | 0.01 | 0.01 | 0.01 | 0.1 | 0.1 | 0.1 | 0.05 |
| | 0.01 | 0.01 | 0.01 | 0.1 | 0.1 | 0.1 | 0.05 | 0.05 |
| | 0.1 | 0.1 | 0.1 | 0.05 | 0.05 | 0.05 | 0.05 | 0.1 |
| | 0.05 | 0.05 | 0.1 | 0.15 | 0.15 | 0.1 | 0.05 | 0.05 |
| | 0.01 | 0.01 | 0.01 | 0.1 | 0.1 | 0.1 | 0.05 | 0.05 |
| | 0.05 | 0.05 | 0.1 | 0.15 | 0.15 | 0.1 | 0.05 | 0.05 |
| | 0.01 | 0.01 | 0.01 | 0.1 | 0.1 | 0.1 | 0.05 | 0.05 |

The number of samples per window, and the number of windows is programmable. Generally, the more samples of the output profile taken and analyzed, the more accurate the weights can be determined. In this example, the output profile of droop detector 112 is sampled within eight stride windows. As input data input[i] (e.g., droop detector output profile) is fed into layers of neural network 214a (e.g., layer 1 through layer n), the input data is classified as valid security threat or a non-security threat. In the non-security threat classification, neural network 214a can further classify the input data as either a result of aging of devices in processor system 101 or truly a non-security threat. The error function during classification is calculated, which is function of the weights and a difference of trained outputs (Vtrain) and sampled outputs (Vsampled). Training is considered complete when mean square of the error Verror is within a target tolerance range Vtarget. Equations 2 through 6 summarize the sensitivity analysis by logic 214b.

$$Vtrain[M, N] = Vt0 + \frac{1}{M}\sum_{M=0;N=0}^{7,7}(Vdroop(M, N)) \quad (2)$$

$$Vsampled[M, N] = V0 + \frac{1}{M}\sum_{M=0;N=0}^{7,7}(Vdroop(M, N)) \quad (3)$$

$$Verror = \frac{1}{M}\sum_{M=0}^{7}(Vtrain[M, N] - Vsampled[M, N])^2 \quad (4)$$

If $Verror \geq Vtartget$; Trained \quad (5)

If $Verror \leq Vtarget$; Continue training \quad (6)

In one example, during runtime droop detector output is sampled across 8 windows and stored in matrix (MxN) as given an example in Table1. Logic 214b generates a root mean square (RMS) error of a difference between stored output and sampled output. If error is more than Vtrain then training stopped. During training phase, logic 214b calculates sensitivity function for neural network 214a for each IP block of interest. The sensitivity function informs the classification of the output (e.g., output [j]) as a function of weights. Logic 214b calculates the sensitivity of first and second layers of DNN. Logic 214b also enables and controls droop detector 112 and adjusts the weights of DNN during training based on a Mean Squared Error (MSE) algorithm. Logic 214b generates error function based on sampled output profile and actual runtime output profile, and calibrate the weights of the DNN. Once the DNN weights are calibrated, logic 214b calculates the sensitivity functions of the weights. The sensitivity function identifies the power supply threats. The error function for link weight training uses output of feature extraction which is referred to as Y [i] and compares with input function X [i], and then compares the error function with a target voltage. Based on MSE, the error function is calculated as:

$$Verror = \frac{1}{M}\sum_{M=0}^{7}(Y[M, N] - X[M, N])^2 \quad (7)$$

If $Verror \geq Vtartget$; Trained \quad (8)

If $Verror \leq Vtarget$; Continue training \quad (9)

During training phase, logic 214b controls droop detector 112 by changing the reference voltage. Training continues till MSE shows error within Vtarget. To calculate the robustness of the weight Wij, its sensitivity is calculated with reference to change in output relative to a delta change € (error) in the weight Wij. The inverse of error function is defined as Y[Wij+€]−Y[Wij], and is the sensitivity function in this case; which is refer as S=1/Y[Wij+€]−Y[Wij]. Note, smaller the error, better the tolerance in terms of converging the weight to the known target. For example, during training, these weights are updated based on a known supply profile. Training then continues till DNN is trained and the measurement are within tolerance limit. Here, tolerance limit (e.g., 1%) defines the error which system is allowed to target. Likewise, larger the error, higher the sensitivity.

Once the weights are determined for the various classifications of interest, the weights are stored in memory. The stored weights are then used for classification of the output of the IP blocks during runtime to determine a classified security threat. While the embodiments here are described with reference to classification of droop output profile, the same technique can be used for profiling outputs of any other circuit or intellectual property (IP) block that can provide insight into a possible security attack of processor system 101.

During runtime or in the field, droop detector 112 detects any small droop in the voltage of the output supply rail Vout. The droop may be caused by a change in impedance of the output supply rail Vout. For example, an active or passive probe when coupled to the output supply rail Vout and/or the input supply rail Vin, may cause a droop in the output supply rail Vout. Droop detector 112 detects that droop on Vout as sampled data. For instance, 256 samples of the droop are taken over different time windows and a matrix of such samples is stored in memory. One example of the matrix is shown in Table 1. The process of sampling the output of droop detector 112 is performed for other IP blocks that are used to detect any abnormal behavior or security threat. The sampled voltage can be expressed as described by equation (3).

In some embodiments, droop detector 112 filters out an overage profile and behave as a noise filter. The filtering process allows for better feature extraction by DNN 214a. Similarly, data from aging sensor 113 is also input to DNN 214a to separate the cause of droop from aging related reasons. In this disclosure, data is clustered in three classifications. The first cluster represents data specific to normal mode of operation. The second cluster represents data specific to aged devices. The third cluster represents data specific to security threat. However, more than three classification can be made by mixing other features such as reliability in addition to aging.

The cluster separation is done by logic 214c, in accordance with some embodiments. Based on the estimated sensitivity function, logic 214c generates close of power droop detector profiles. Logic 214c then categorizes the profiles into at least three clusters—aged data (cluster 1), secure data (cluster 2), and power supply threat data (cluster 3). Logic 214c uses aging sensor information to extract aged vs. non-aged cluster data. Logic 214c then calculates the mean of these clusters and sends the mean to decision matrix logic 214d.

In some embodiments, decision matrix logic 214d uses the mean information from logic 214c and calculates mean distance between clusters. The distances between data points in different clusters is used to identify the type of classification—normal, aged, or security threat. These mean distances are, for example, D1, D2, D3, and D4, as discussed with reference to FIG. 3. Distance D1 refers to mean cluster distance between secure aged or non-aged data. Distance D2 refers to a distance within which data indicative of threats exist. For example, distance D2 are within threat cluster distance. Distance D3 refers to intra cluster distance for aged data. Distance D4 refers to intra-cluster distance for non-aged and secured one. Based on the distance, decision matrix logic 214d is able to identify if: D1 is greater than measurement defined threshold and D2 is less than the a measurement defined threshold, and if so, power supply threat is detected. The measurement defined threshold is a tolerance level which is programmable. In various embodiments, the comparison of D1 against the measurement defined threshold is performed by a comparison logic. The output of the comparison logic is used to group the data into different circles or clusters to identify threat data or unsecured data. If D4 is less than data secure target, then the data is considered secure data or non-aged data. If D3 is less than D4, but D3 is less than aged target data, then data is considered secure non-aged data. The output of decision matrix is then used to take any mitigation action by secure block and/or the p-unit when the type of classification happens to be a security threat.

In some embodiments, the classified outputs are digitized outputs that are organized or plotted in one plane based on classification. Data means of the digitized outputs is calculated and then distance between these two data points which belong to the same classification is identified. During classification, all the data points lie within one circle (e.g., secured and aged) while unsecured data points lie within another circle. In one example, data which are changed due to probing shows 100 mV variations; while data which are normal operation are within 50 mV range; data which changes due to aging are within 50 mV+/−20 mV ranges. These data points lie within one circle, while unsecure data lies within another circle. A way to measure a boundary of secure and unsecure data is to calculate the distance between two sets of data points. This approach to determine the boundary is called a distancing approach.

Figure 3:
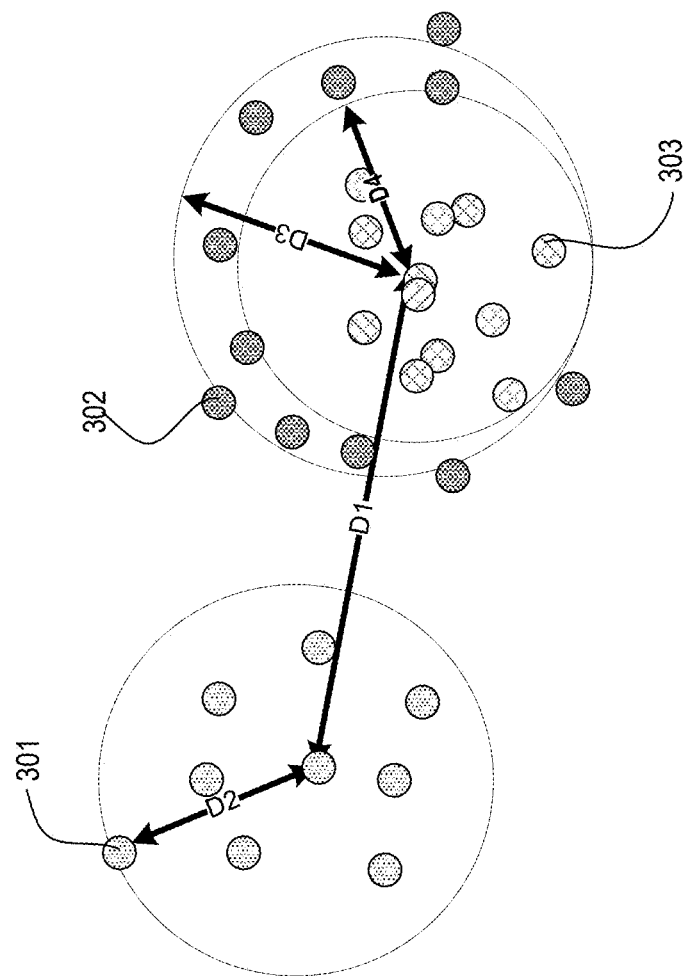
FIG. 3 illustrates a view of data clustered based specification vs. threat, in accordance with some embodiments.

FIG. 3 illustrates a view of clustered data 300 based on specification vs. threat, in accordance with some embodiments. In this example, three clusters are shown. The first cluster has data 301, the second cluster has data 302, and the third cluster has data 303. In various embodiments, decision logic 214d calculates the distances (e.g., D1, D2, D3, and D4) between the clustered data. Clustering distance D1 is a maximum distance between data 301 and 303. If clustering distance D1 from data of type 303 and data lies within distance D2, then the sampled data refers to as unsecure or threat data. If clustering data (such as data 302) lies within distance D3 and output side of distance D4, then the data is aged data. If clustering of data is within distance D4 then the sampled data is normal data (i.e., secure and non-aged data). In some embodiments, when data is identified as being associated with a security attack, communication with security block (e.g., a region of processor 101 that holds cryptographic keys) is blocked or locked, and OS 102 and/or any other suitable component is notified of the security attack.

Figure 4:
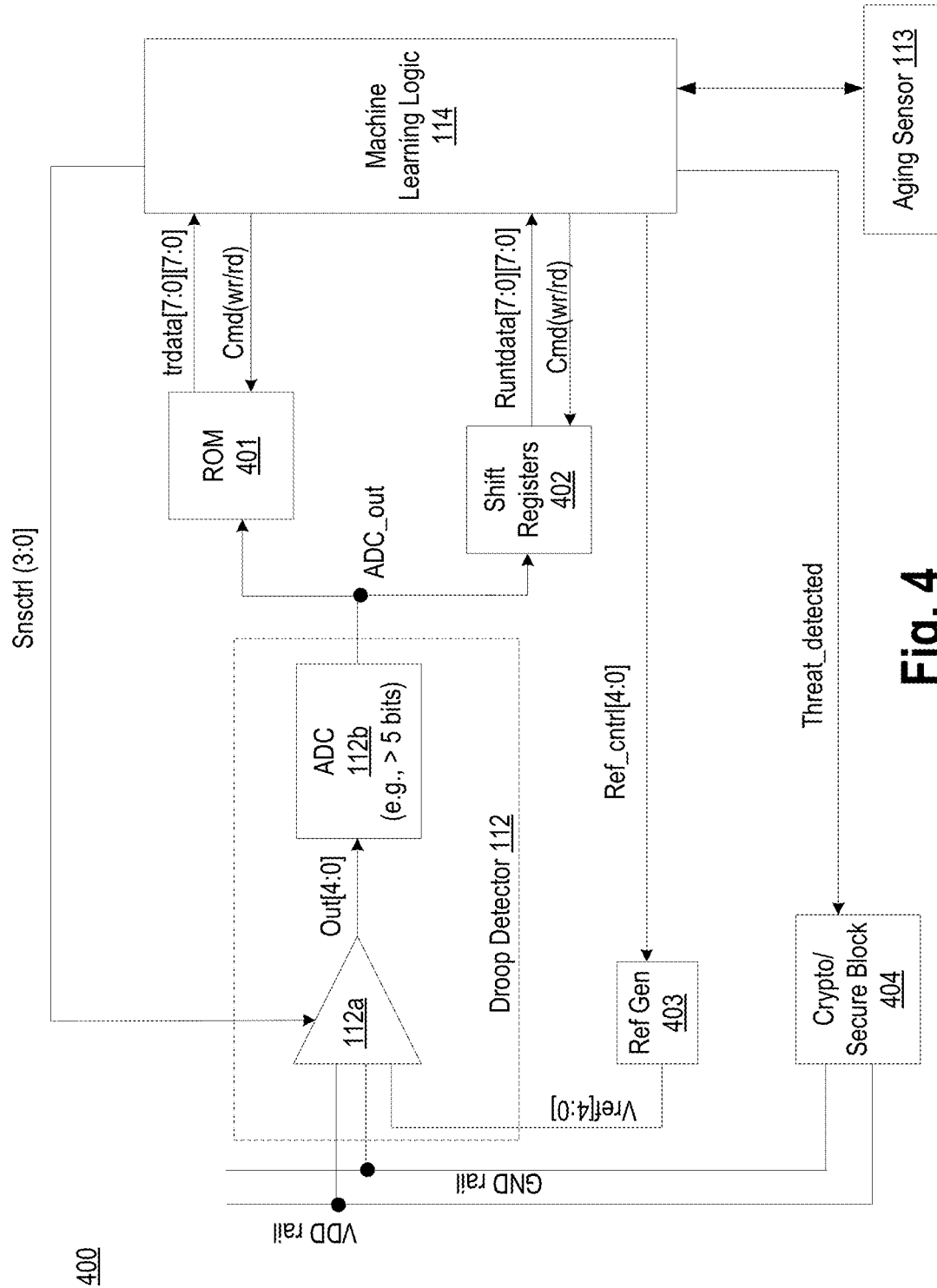
FIG. 4 illustrates an apparatus for power supply threat detection, in accordance with some embodiments.

FIG. 4 illustrates apparatus 400 for power supply threat detection, in accordance with some embodiments. Apparatus 400 comprises droop detector 112 having comparator 112a and analog-to-digital converter (ADC) 112b. Apparatus 400 further comprises read-only memory (ROM) 401, shift registers 402, reference generator (Ref. Gen) 403, cryptographic secure block 404, machine learning logic 114, and aging sensor 113.

In various embodiments, droop detector 112 is used for self-training during production phase and also used for sending during infield runtime phase. Droop detector 112 thus acts as a feature extractor to enable un-supervised learning. During this process of un-supervised learning, the droop detector sensitivity is adjusted. In some embodiments, strength of devices in comparator 112a is adjusted to change the sensitivity of comparator 112a. For example, 4-bit control Snsctrl[3:0] from machine learning logic 114 is used to adjust a gain of comparator 112a, and thus its sensitivity for detecting droop on VDD rail. Droop detector 112 also filters out noise on the supply rail (VDD rail) and the ground rail (GND rail).

In various embodiments, the voltage on VDD rail is compared against multiple thresholds to determine the magnitude of the droop on VDD rail. In this example, a 5-bit reference code is used to set a number of reference voltages for comparator 112a. As such, comparator 112a compares the voltage on VDD rail at various thresholds. The reference voltages are generated by reference generator 403. Any suitable reference generator may be used for Ref. Gen. 403. For example, a bandgap reference, voltage divider, resistor divider, capacitor divider, etc., can be used to generate one or more adjustable reference voltages. In some embodiments, comparator 112a has a single reference, which is adjusted by a digital code. In some embodiments, machine learning logic 114 adjusts the reference voltage for comparator 112a via reference control (5-bit code Ref_cntrl[4:0]) to modify the trip point of comparator 112a.

In some embodiments, analog-to-digital converter (ADC) 112b converts the analog output Out to a digital code ADC_out. ADCs are apparatuses that convert continuous physical quantities (e.g., voltages) to digital numbers that represent the amplitude of the physical quantities. Any suitable ADC may be used to implement ADC 112b. For example, ADC 112b is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC. For purposes of explaining the various embodiments, ADC 112b is considered to be a flash ADC.

In some embodiments, there are multiple comparators 112a for multiple reference voltages (e.g., Vref[4:0]), and ADC 112b converts the analog outputs (e.g., five outputs on bus Out) to digital output, ADC_out. In some embodiments, machine learning logic 114 issues command (Cmd) to read from and/or write to ROM 401. The output ADC_out is stored in a local memory 401 (e.g., Read only memory ROM) using a write (wr) command provided by ML logic 114. During training phase, the output (e.g., training data trdata[7:0][7:0]) of ROM 401 is read (rd) by machine learning logic 114 to determine the weights for classification of the various features for deep neural network training. The output of ROM 401 is read (rd) by ML logic 114 and weights are adjusted to correctly classify the output ADC_out in view of output of aging sensor 113.

The size of memory 401 is selected based on a number of IP blocks detected within processor system 101 and time windows of data. For example, size of memory 401 is N×M×L×K, where 'N' is a number of IP blocks (including droop detector 112, aging sensor 113), 'M' (e.g., 8) is the number of samples, (e.g., 8) is the number of time windows, and 'K' (e.g., 256) are samples to cover cryptographic keys.

In some embodiments, machine learning logic 114 includes a finite state machine (FSM) to use data stored in ROM 401 for training, and then using trained weights for classification using runtime. During runtime phase, the FSM monitors the output ADC_out of droop detector 112 and that stored in memory 401, in addition to the output of aging sensor 113 to determine aged vs. non-aged feature extractions. During runtime, ADC_out is stored in shift registers using write (wr) command. The runtime data (e.g., Rundata [7:0][7:0]) is read (rd) by ML logic 114 along with previously trained weights to classify the data.

During training phase, the FSM of ML logic 114 adjusts weights (e.g., increments weights) and calculates an error function, generates root mean square (RMS) of the error, and compares the RMS of the error with a targeted output. When the RMS error value is more than the defined target, then training of the neural network is deemed complete. The weights are then stored in memory (e.g., non-volatile memory) and accessed during runtime for inference of ADC_out. Once a thread is detected by a decision matrix of ML logic 114, an alert is issued (e.g., Threat_detected signal is asserted). The alert can cause one of more cryptographic or secure blocks 404 to power down, disconnect from other components, or take other measures to safe guard its cryptographic key(s).

Figure 5:
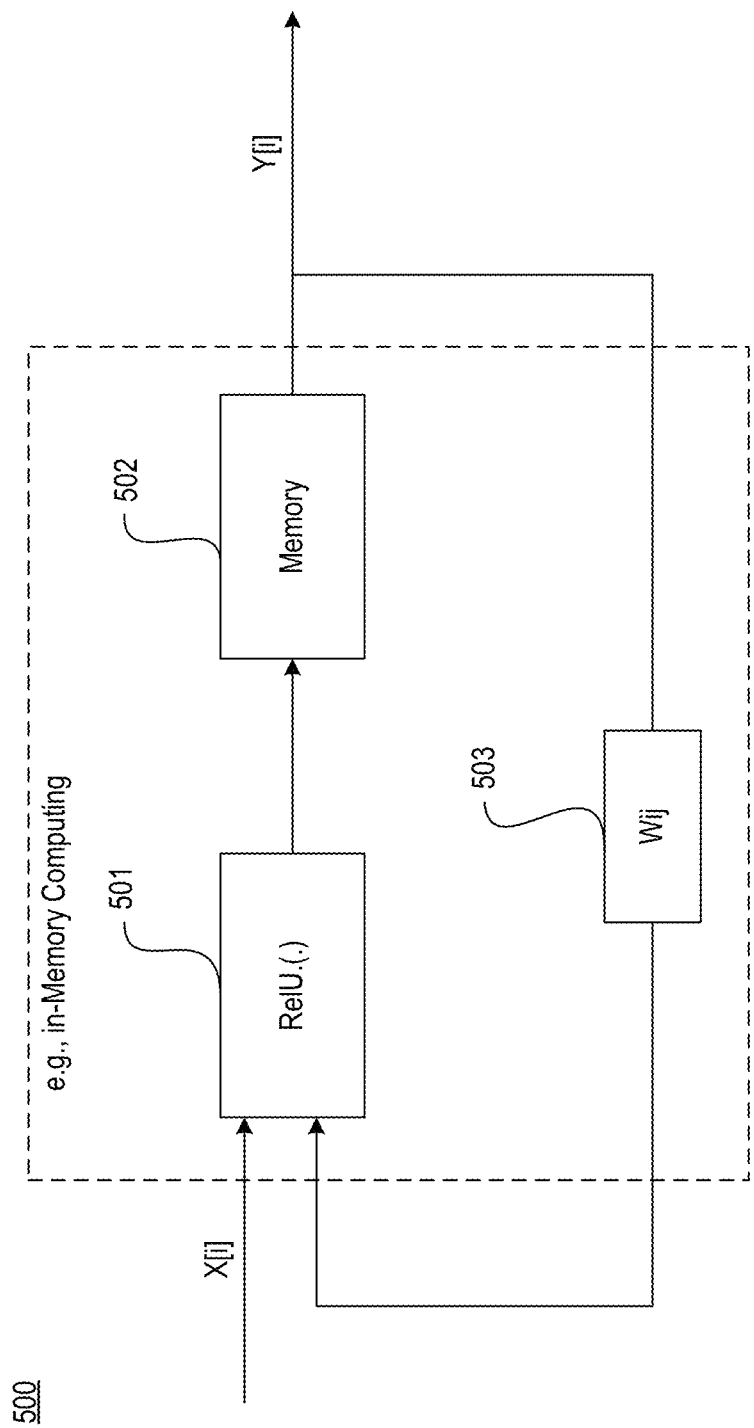
FIG. 5 illustrates a high-level architecture of deep neural network (DNN), in accordance with some embodiments.

FIG. 5 illustrates a high-level architecture 500 of deep neural network (DNN), in accordance with some embodiments. Architecture 500 comprises rectifier linear unit 501 (ReU.(.)), memory 502, and weights 503. Input X[i] is received by rectifier linear unit 501 along with current weights Wij 503. Rectifier linear unit 501 applies an activation function (or a ramp function) to input X[i]. Memory 502 receives the output of rectifier linear unit 501.

In some embodiments, memory elements or storing elements 502 are used to store the output of rectifier linear unit 501. The computations depend on the Rel function information from rectifier linear unit 501. The Rel function information is stored in short term memory banks of memory 502, and this information is later retrieved for calculating weight function Wij. DNN network comprises various logic cells that perform temporary calculations, use stored information and then pass computed results to a next stage of DNN 214a. Computation in each layer of the DNN is combination of weights of previous and later layer stages. In some embodiments, an in-memory computation technique is used where memory and computational logic reside together in one logic area to minimize the latency in accessing stored weights and performing quick computations of DNN. For example, pairs of multipliers (and/or adder) and memory cells are grouped to process input and generate an output for a next stage of DNN. Multiple such pairs of multipliers (and/or adder) and memory cells can perform faster DNN computations than logic that performs calculations and accesses data from a large memory.

Figure 6:
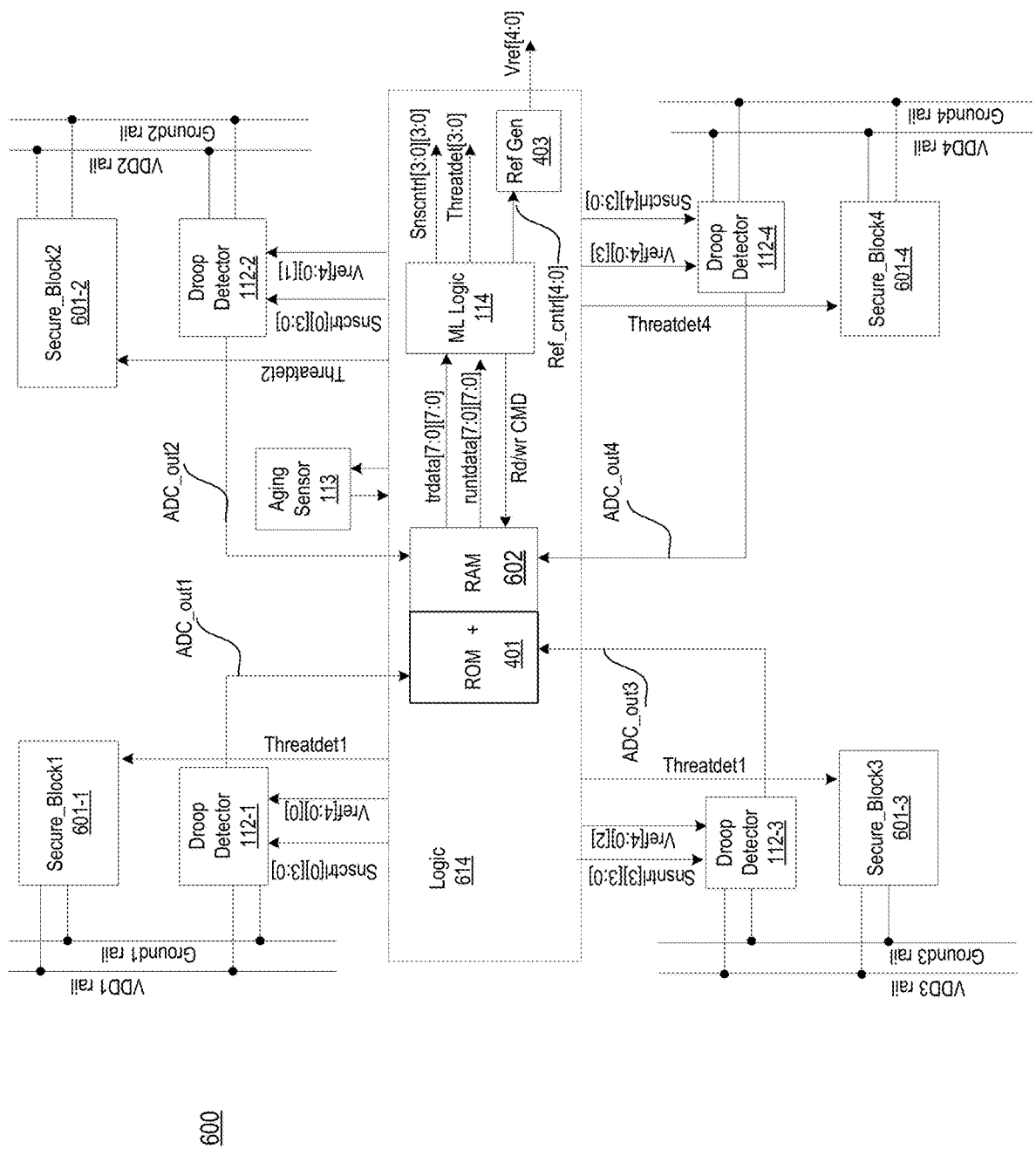
FIG. 6 illustrates a high-level architecture of power supply threat detection in a system-on-chip (SoC), in accordance with some embodiments.

FIG. 6 illustrates a high-level architecture 600 of power supply threat detection in a system-on-chip (SoC), in accordance with some embodiments. Architecture 600 is similar to apparatuses or architectures 200 and 400, but with a plurality of droop detectors (e.g., 112-1, 112-2, 112-3, and 112-4) and secure blocks (601-1, 601-2, 601-3, and 601-4). The operation of architecture 600 is similar to that of architecture 400 which describes a single droop detector 112 and a single secure block 404. Each droop detector receives its own sensitivity control and reference voltage from accelerator logic 614. For example, detector 112-1 receives sensitivity control Snsctr[0][3:0], detector 112-2 receives sensitivity control Snsctr[1][3:0], detector 112-3 receives sensitivity control Snsctr[2][3:0], and detector 112-3 receives sensitivity control Snsctr[3][3:0]. Likewise, detector 112-1 receives reference voltage Vref[4:0][0], detector 112-2 receives reference voltage Vref[4:0][1], detector 112-3 receives reference voltage Vref[4:0][2], and detector 112-4 receives reference voltage Vref[4:0][3]. The digital output of each detector is received by logic 614 (e.g., accelerator logic, machine-learning global logic, or main logic) for classification. For example, accelerator logic 614 receives output ADC_out1 from detector 112-1, accelerator logic 614 receives output ADC_out2 from detector 112-2, accelerator logic 614 receives output ADC_out3 from detector 112-3, and logic 614 receives output ADC_out4 from detector 112-4. In some embodiments, logic 614 is separate from processor core to provide accelerated results with minimum latency.

ML logic 114 allows detector output profile to be stored in memory 401 and 602 using read (rd) and write (wr) commands (Cmd). In some embodiments, ROM 401 stores computed weights from a training phase while RAM 602 stores local weights that are adjusted during training phase.

In some embodiments, computations by intermediate layer(s) (e.g., hidden layers) of the DNN are stored in RAM 602 while trained weights are stored in ROM 401.

ML logic 114 receives the training data (trdata[7:0][7:0]) and runtime data (rundata[7:0][7:0]) and generates the classification decision (e.g., threat detection Threatdet[3:0]) for each secure block. For example, secure_block1 601-1 receives Threatdet1, secure_block2 601-2 receives Threatdet2, secure_block3 601-3 receives Threatdet3, and secure_block4 601-4 receives Threatdet4. Based on the logic value of the threat (e.g., whether it indicates a threat or a non-threat), each secure block takes risk mitigation actions to safe guard the crypto keys. During training phase, ML logic 114 controls the sensitivity of each detector using Senscrtrl [3:0][3:0].

In some embodiments, each droop detector detects a droop in a local supply rail. For example, droop detector 112-1 detects droop in VDD1 rail relative to Ground1 rail, droop detector 112-2 detects droop in VDD2 rail relative to Ground2 rail, droop detector 112-3 detects droop in VDD3 rail relative to Ground3 rail, and droop detector 112-4 detects droop in VDD4 rail relative to Ground4 rail. In some embodiments, droop detectors 112-1 through 112-4 detect droop in the same VDD rail relative to a ground rail are different physical locations of the VDD rail.

Figure 7:
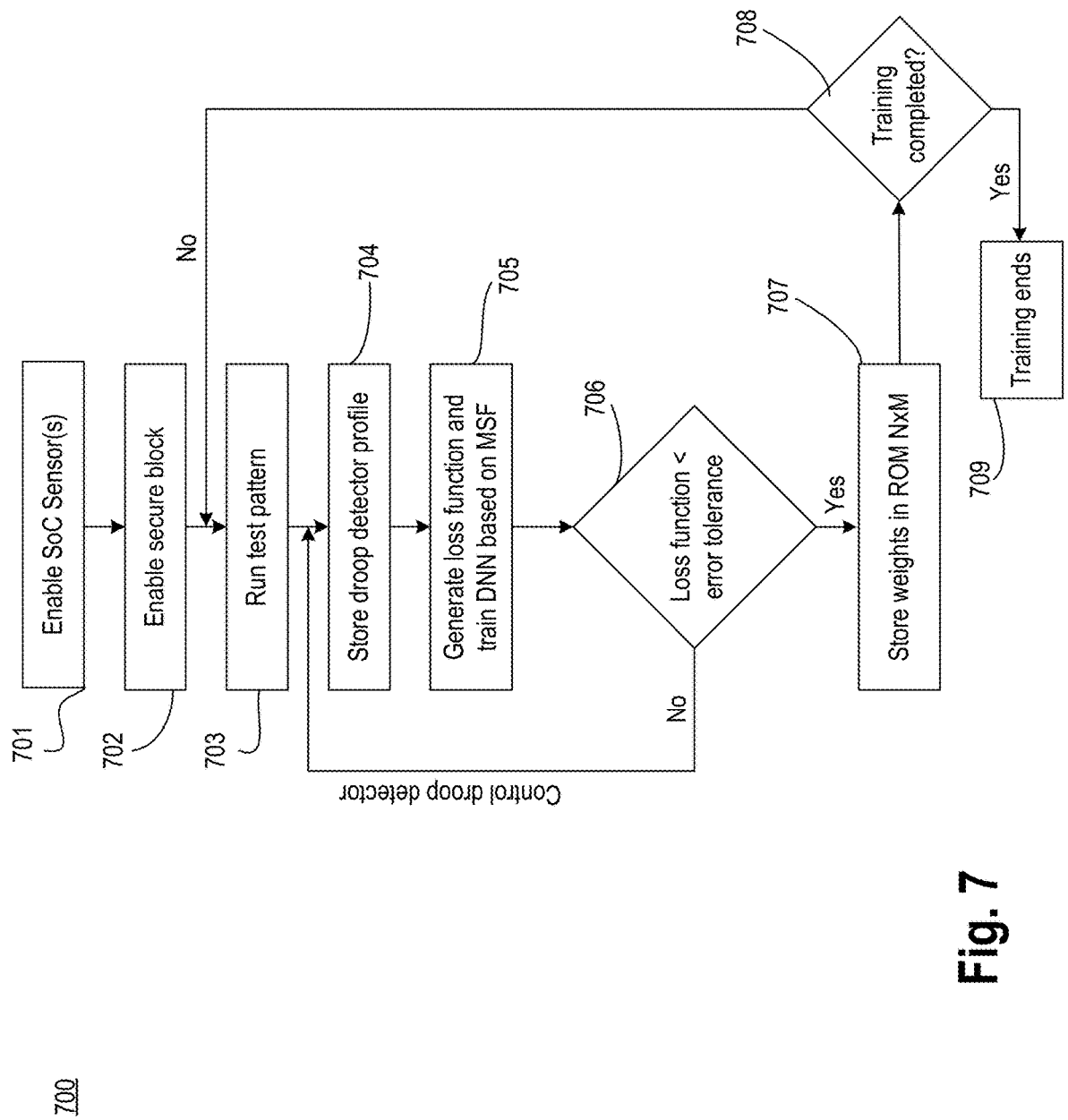
FIG. 7 illustrates a flowchart of a method to train weights for the DNN, in accordance with some embodiments.

FIG. 7 illustrates flowchart 700 of a method to train weights for the DNN, in accordance with some embodiments. While the blocks are shown in a particular order, the order can be modified. For example, some blocks may be performed in parallel, while some blocks can be performed before others. The various blocks can be performed by software, hardware, or a combination of then.

At block 701, various sensors in processor system 101 are enabled to identify anomalies that may be a security threat to processor system 101. For example, sensors such as droop detector 112 and aging sensor 113 are enabled by an enable signal or by a power good signal, or the like to ensure they are ready to perform their functions. At block 702, secure block 404 (or 601) are enabled. Enabling the secure block(s) allows the secret or cryptographic keys to be accessed or transmitted to logic or circuits to enable certain functions (e.g., communication with OS 102, communication with peripheral components, access to fuses, etc.). At block 703, a test pattern is run on processor system 101 where voltage on one or more power supply rails is stressed, causing a droop. The droop is detected by droop detector 112, and its digital form is stored in memory 401. The detection of droop is performed at various time points in different time windows. As such, droop profile data is gathered for analysis by ML logic 114. At block 705, ML logic 114 generates the loss or error function and trains DNN based on MSF. In this process, sensitivity of droop detectors 112 is adjusted and weights are computed that correctly classify the droop profile data. During this process, aging data from aging sensor 113 is also analyzed to identify whether the droop on the power supply rail is from a threat on the supply rail or an artifact of natural aging of devices.

At block 706, ML logic 114 decide of the error function output relative to an error tolerance or target voltage. If the error function output is less than the error tolerance or target voltage, the weights are stored in memory 401 as indicated by block 707. Otherwise, the process proceeds to block 704 and the output of droop detector 112 is again saved. During this process the sensitivity of droop detector 112 is modified and weights recalibrated. The process continues till the error function output is less than the error tolerance. At block 708, ML logic 114 determines whether training of DNN for each IP block is complete, if so, the process proceeds to block 709 where training is deemed complete. Otherwise, the process proceeds to block 703 where test patterns are rerun and the process continues.

Figure 8:
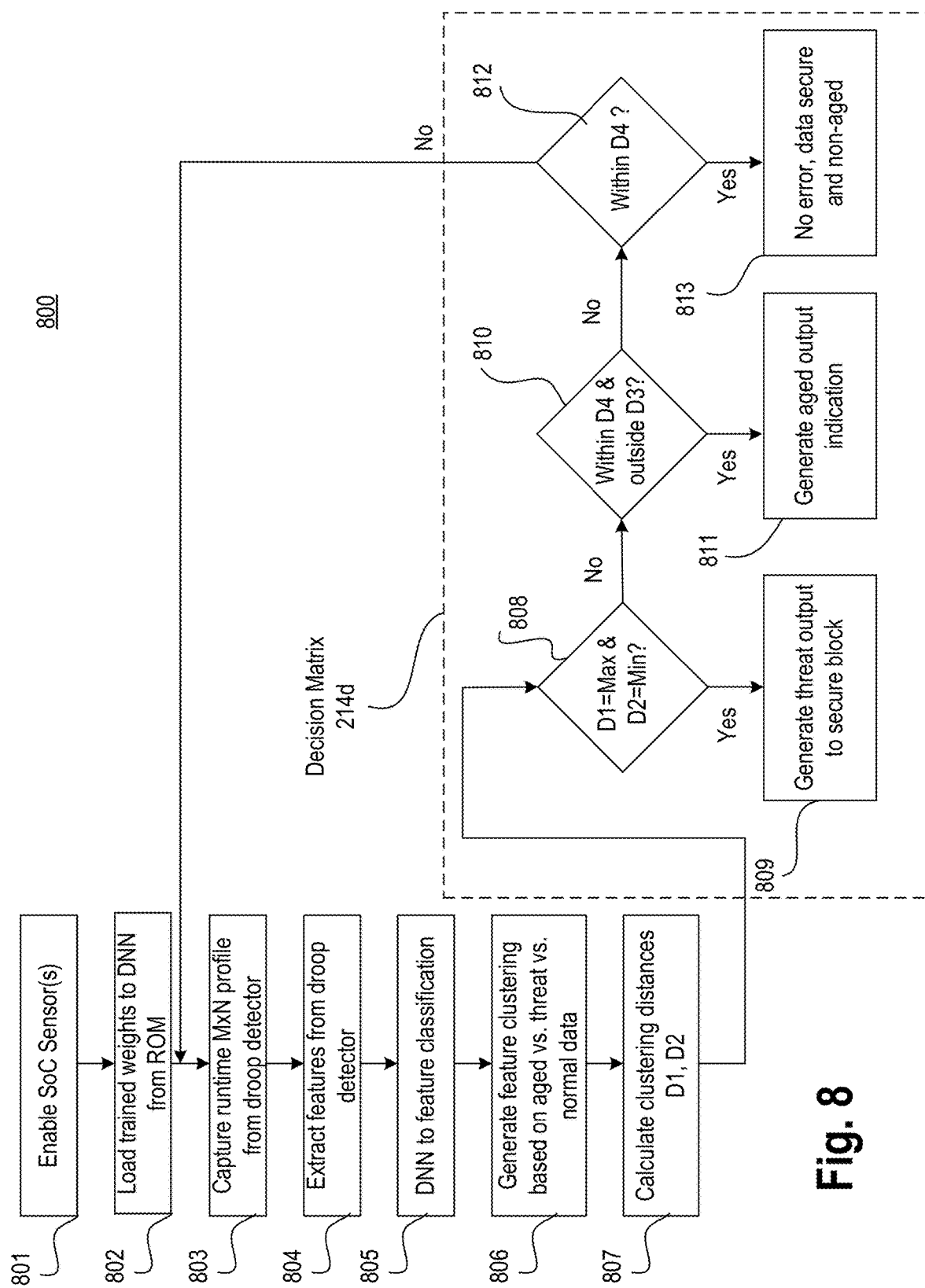
FIG. 8 illustrates a flowchart of a method to detect threat vs. non-threats, in accordance with some embodiments.

FIG. 8 illustrates flowchart 800 of a method to detect threat vs. non-threats, in accordance with some embodiments. While the blocks are shown in a particular order, the order can be modified. For example, some blocks may be performed in parallel, while some blocks can be performed before others. The various blocks can be performed by software, hardware, or a combination of then.

At block 801, various sensors in processor system 101 are enabled to identify anomalies that may be a security threat to processor system 101. For example, sensors such as droop detector 112 and aging sensor 113 are enabled by an enable signal or by a power good signal, or the like to ensure they are ready to perform their functions. At block 802, trained weights are loaded from memory 401 and applied to DNN for classifying new data obtained from various sensors at runtime. At block 803, runtime data from IP blocks (such as a droop detector 112) is captured at various time points and time windows, forming a M×N array of profile data. This data is stored in shift registers 402 and then analyzed by ML logic 114. At block 804, ML logic 114 extracts features from the output profile of the various IP blocks (e.g., droop detector 112). At block 805, DNN classifies the extracted features based on the pretrained weights. At block 806, logic 214c generates feature clustering followed by calculating clustering distances at block 807 (e.g., D1, D2, D3, D4) as described with reference to FIGS. 2-3.

The process then proceeds to performing a decision regarding the classified feature. In some embodiments, decision matrix logic 214d uses the mean information from logic 214c and calculates mean distance between clusters. The distances between data points in different clusters is used to identify the type of classification—normal, aged, or security threat. These mean distances are, for example, D1, D2, D3, and D4, as discussed with reference to FIG. 3. Distance D1 refers to mean cluster distance between secure aged or non-aged data. Distance D2 refers to a distance within which data indicative of threats exist. For example, distance D2 are within threat cluster distance. Distance D3 refers to intra cluster distance for aged data. Distance D4 refers to intra-cluster distance for non-aged and secured one. Based on the distance, decision matrix logic 214d is able to identify at block 808 if D1 is greater than data threat and D2 is less than data threat intra, and if so, power supply threat is detected. At block 809, the power supply threat is informed to secure block 404. If D1 is less than data threat or D2 is greater than data threat intra, the process proceeds to block 810. At block 810, if it is determined that the data is within distance D4 but outside of D3, then the data is considered aged output as indicated by block 811. Otherwise, the process proceeds to block 812. At block 812, if D4 is less than data secure target, then the data is considered secure data or non-aged data and reported as such to p-unit or secure block 404 as indicated by block 813. The output of decision matrix is then used to take any mitigation action by secure block and/or the p-unit when the type of classification happens to be a security threat.

Elements of embodiments are also provided as a machine-readable medium (e.g., memory) for storing the computer-executable instructions (e.g., instructions to implement any other processes discussed herein). In some embodiments, a computing platform comprises a memory, a processor, a machine-readable storage media (also referred to as tangible machine readable medium), a communication interface (e.g., wireless or wired interface), and a network bus coupling them.

In some embodiments, the processor is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of the system are coupled together via the network bus. Any suitable protocol may be used to implement the network bus. In some embodiments, the machine-readable storage medium includes instructions (also referred to as the program software code/instructions) for intelligent prediction of processor idle time as described with reference to the various embodiments and flowchart.

Program software code/instructions associated with flowchart(s) (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 500 (and/or various embodiments) are executed by the computer system.

In some embodiments, the program software code/instructions associated with flowchart 500 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowchart 500 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, magnetic random-access memory, ferroelectric memory, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, the tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 9:
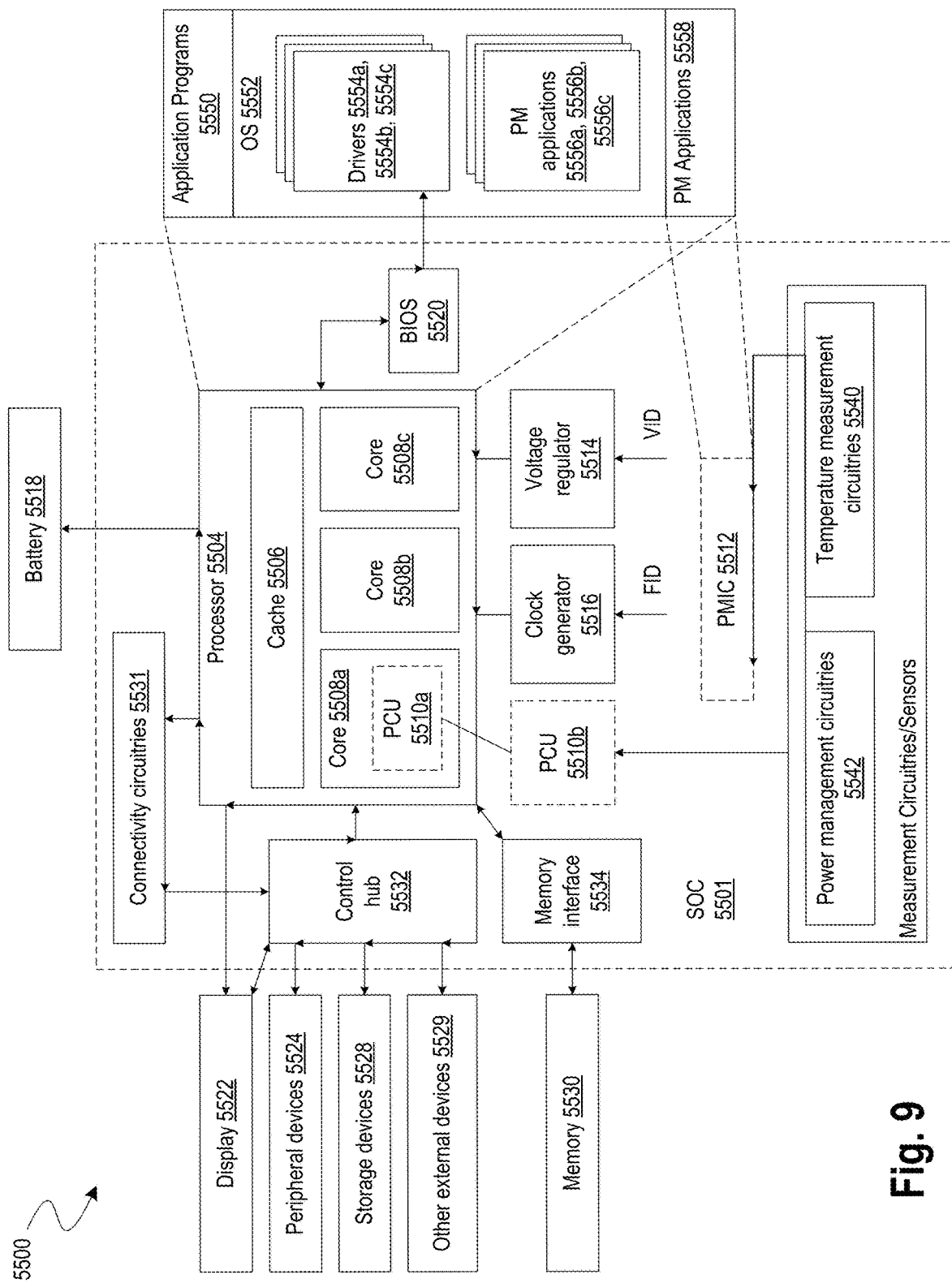
FIG. 9 illustrates a smart device or a computer system or a SoC (System-on-Chip) with hardware based unsupervised based ML approach to identify and mitigate a security threat, in accordance with some embodiments.

FIG. 9 illustrates a smart device or a computer system or a SoC (System-on-Chip) with hardware based unsupervised based ML approach to identify and mitigate a security threat, in accordance with some embodiments. It is pointed out that those elements of FIG. 9 having the same reference numbers (or names) as the elements of any other figure may operate or function in any manner similar to that described, but are not limited to such. Any block in this smart device can have the hardware based unsupervised based ML approach to identify and mitigate a security threat.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 9, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 9, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508*a*, 5508*b*, 5508*c*, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., CO state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510b.

In some embodiments, pCode executing on PCU 5510a/b has a capability to enable extra compute and telemetries resources for the runtime support of the pCode. Here pCode refers to a firmware executed by PCU 5510a/b to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right." "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments are described as examples. The examples can be combined in any suitable manner. For instance, example 5 can be combined with example 3 and/or example 7.

Example 1: An apparatus comprising: a droop detector to detect a droop of a voltage on a power supply rail; and a machine-learning logic coupled to the droop detector, wherein the machine-learning logic is to classify the droop as one of a security threat to the apparatus or a non-security event.

Example 2: The apparatus of example 1, wherein the machine-learning logic is to adjust a sensitivity of the droop detector.

Example 3: The apparatus of example 1 comprises memory to store weights applied by the machine-learning logic to classify the droop.

Example 4: The apparatus of example 3, wherein the weights are determined during a training phase, and wherein the weights are applied during a runtime phase.

Example 5: The apparatus of example 1, wherein the machine-learning logic is part of a in-memory logic that comprises memory and computational blocks to determine weights and use the weights to classify the droop.

Example 6: The apparatus of example 1, wherein the droop detector is to sample the voltage at different times and for different time windows to generate an array of data for the machine-learning logic to process.

Example 7: The apparatus of example 1 comprises a shift-register to store output of the droop detector.

Example 8: The apparatus of example 1, wherein the droop detector comprises a comparator and an analog-to-digital converter (ADC) coupled to the comparator.

Example 9: The apparatus of example 8 comprising a reference generator to provide an adjustable reference to the comparator.

Example 10: The apparatus of example 9, wherein the machine-learning logic is to adjust the adjustable reference.

Example 11: The apparatus of example 1, wherein the machine-learning logic comprises a deep neural network that applies unsupervised machine-learning.

Example 12: The apparatus of example 11 comprising logic coupled to the machine-learning logic, wherein the logic is to separate output of deep neural network into clusters.

Example 13: The apparatus of example 12 comprising a decision logic to process distances between clusters and identify whether the droop is a security threat or a non-security event.

Example 14: The apparatus of example 13, wherein if the decision logic identifies that the droop is a security threat, the decision logic is to notify one or more secure logics about the security threat for risk mitigation.

Example 15: The apparatus of example 1 comprises an aging sensor coupled to the machine-learning logic, wherein the machine-learning logic is to classify the droop as a aging related event based on data from the aging sensor.

Example 16: An apparatus comprising: a power supply rail; an aging sensor to detect aging of one or more devices in the apparatus; a droop detector to detect a droop of a voltage on the power supply rail; and an unsupervised deep neural network based machine-learning logic coupled to the droop detector and the aging sensor, wherein the unsupervised deep neural network based machine-learning logic is to classify the droop as one of a security threat to the apparatus, a non-security event, or an aging event.

Example 17: The apparatus of example 16, wherein the droop detector is to sample the voltage at different times and for different time windows to generate an array of data for the machine-learning logic to process.

Example 18: The apparatus of example 16 comprises memory to store weights applied by the machine-learning logic to classify the droop.

Example 19: The apparatus of example 16, wherein weights for unsupervised deep neural network are determined during a training phase, and wherein the weights are applied during a runtime phase.

Example 20: A system comprising: a memory; a processor coupled to the memory; and a wireless interface to allow the processor to communicate with another device, wherein the processor comprises: a droop detector to detect a droop of a voltage on a power supply rail; and a machine-learning logic coupled to the droop detector, wherein the machine-learning logic is to classify the droop as one of a security threat to the processor or a non-security event.

Example 21: The system of example 20, wherein the machine-learning logic is to adjust a sensitivity of the droop detector, wherein the machine-learning logic is part of an in-memory logic that comprises memory and computational blocks to determine weights and use the weights to classify the droop.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a droop detector to sample voltages on a power supply rail during a droop on the power supply rail, wherein the voltages are sampled at different time points in a time window to determine a droop profile; and
a machine-learning logic coupled to the droop detector, wherein the machine-learning logic is to extract features of the droop profile and, based on the extracted features, determine whether to classify the droop as a security threat to a processor.

2. The apparatus of claim 1, wherein the droop detector comprises a comparator, and the machine-learning logic is to adjust a gain of the comparator during unsupervised learning of the machine-learning logic.

3. The apparatus of claim 1, further comprising a memory to store weights applied by the machine-learning logic to classify the droop.

4. The apparatus of claim 1, wherein the machine-learning logic is part of an in-memory logic that comprises memory and computational blocks to determine weights and use the weights to classify the droop.

5. The apparatus of claim 1, wherein the droop detector is to sample voltages on the power supply rail during different droops on the power supply rail, and the voltages of the different droops are sampled at different time points in different time windows to generate an array of data for the machine-learning logic to process.

6. The apparatus of claim 1, further comprising a shift-register to store an output of the droop detector.

7. The apparatus of claim 1, wherein: the droop detector comprises a comparator to compare the voltages on the power supply rail to an adjustable reference voltage, the apparatus further comprises a reference generator to provide the adjustable reference voltage to the comparator, and the machine-learning logic is to adjust the adjustable reference voltage.

8. The apparatus of claim 1, wherein the machine-learning logic comprises a deep neural network to apply unsupervised machine-learning.

9. The apparatus of claim 1, wherein:
the machine-learning logic is to separate an output of a neural network into clusters; and
to determine whether to classify the droop as the security threat, the machine-learning logic is to determine whether an inter-cluster distance of the neural network is greater than a threshold.

10. The apparatus of claim 9, wherein:
the power rail is to power the processor; and
to determine whether to classify the droop as involving aging of devices in the processor, the machine-learning logic is to determine whether an intra-cluster distance of the neural network is greater than a threshold.

11. The apparatus of claim 1, wherein the apparatus is in a system, and if the droop is classified as the security threat, the machine-learning logic is to power down the system.

12. The apparatus of claim 1, further comprising an aging sensor coupled to the machine-learning logic, wherein the machine-learning logic is to determine whether to classify the droop as an aging-related event based on data from the aging sensor.

13. The apparatus of claim 1, wherein to determine whether to classify the droop as the security threat:
the droop detector is to sample voltages on the power rail during different droops on the power supply rail, wherein the voltages of the different voltage droops are sampled at different time points in different time windows to determine different droop profiles; and
the machine-learning logic is to extract features of the different droop profiles.

14. The apparatus of claim 1, wherein:
if the machine-learning logic does not classify the droop as the security threat, the machine-learning logic is to determine whether to classify the droop as an aging event; and
if the machine-learning logic does not classify the droop as the aging event, the machine-learning logic is to determine whether to classify the droop as a non-security event.

15. The apparatus of claim 1, wherein:
the power rail is to power the processor; and
if the droop is classified as the security threat, the machine-learning logic is to disconnect the processor from a peripheral.

16. The apparatus of claim 1, wherein if the machine-learning logic classifies the droop as the security threat, the machine-learning logic is to reduce access to a register.

17. An apparatus, comprising:
a voltage regulator coupled to a power supply rail;
an aging sensor to detect aging of one or more devices in the apparatus;
a droop detector to detect a droop of a voltage on the power supply rail; and
a machine-learning logic coupled to the droop detector and the aging sensor, wherein the machine-learning logic is to classify the droop as a security threat to the apparatus when the voltage has a first variation, a non-security event when the voltage has a second variation less than the first variation, or an aging event when the voltage has a variation which is within a range of the second variation.

18. The apparatus of claim 17, wherein the droop detector is to sample the voltage at different times and for different time windows to generate an array of data for the machine-learning logic, and the machine-learning logic to classify the droop based on the array of data.

19. The apparatus of claim 17, further comprising a memory to store weights applied by the machine-learning logic to classify the droop.

20. A system, comprising:
a memory; and
a processor coupled to the memory, wherein the processor comprises:
 a droop detector to detect a droop profile of a voltage droop on a power supply rail; and
 a machine-learning logic coupled to the droop detector, wherein the machine-learning logic is to:
  extract features of the droop profile;
  implement a neural network;
  based on the extracted features, determine an inter-cluster distance of the neural network; and
  determine whether to classify the voltage droop as a result of probing of the power supply rail based on the inter-cluster distance.

21. The system of claim 20, wherein:
the power rail is to power the processor; and
to determine whether to classify the voltage droop as involving aging of devices in the processor, the machine-learning logic is to determine whether an intra-cluster distance of the neural network is greater than a threshold.

* * * * *